United States Patent
Wang

(10) Patent No.: US 10,894,228 B2
(45) Date of Patent: Jan. 19, 2021

(54) INFLATABLE VALVE FILTER

(71) Applicant: Digo Creative Enterprise Ltd., Shanghai (CN)

(72) Inventor: Yan Wang, Shanghai (CN)

( * ) Notice: Subject to any disclaimer, the term of this patent is extended or adjusted under 35 U.S.C. 154(b) by 242 days.

(21) Appl. No.: 16/161,047

(22) Filed: Oct. 15, 2018

(65) Prior Publication Data
US 2020/0114294 A1 Apr. 16, 2020

(51) Int. Cl.
| | |
|---|---|
| *B01D 46/24* | (2006.01) |
| *F16K 51/00* | (2006.01) |
| *B01D 46/42* | (2006.01) |
| *B01D 46/54* | (2006.01) |
| *A63H 23/10* | (2006.01) |

(52) U.S. Cl.
CPC ..... *B01D 46/2403* (2013.01); *B01D 46/4272* (2013.01); *B01D 46/543* (2013.01); *F16K 51/00* (2013.01); *A63H 23/10* (2013.01); *B01D 2279/10* (2013.01)

(58) Field of Classification Search
CPC ........... B01D 46/2403; B01D 46/4272; B01D 2275/202; B01D 46/543; B01D 2279/10; F16K 51/00; A63H 23/10
See application file for complete search history.

(56) References Cited

U.S. PATENT DOCUMENTS

| | | | |
|---|---|---|---|
| 2018/0160871 A1* | 6/2018 | Cho | ....................... A47L 9/1666 |
| 2019/0274866 A1* | 9/2019 | Chang | ........................ A61F 5/32 |
| 2020/0108185 A1* | 4/2020 | Lintula | ............... A61M 1/0056 |

\* cited by examiner

*Primary Examiner* — Robert Clemente
(74) *Attorney, Agent, or Firm* — Xuan Zhang

(57) ABSTRACT

A valve filter used for inflatable having infill inside. The valve filter has a filter body to stop the infill from escaping from the inflatable, and a patching sleeve to be attached on the inflatable or air valve of the inflatable.

14 Claims, 5 Drawing Sheets

INFLATABLE VALVE FILTER

BACKGROUND

1. Field of the Invention

The present invention relates to a valve filter. More particularly, the filter can prevent escaping of stuffed material inside the inflatable.

2. Discussion of the Related Art

Almost every inflatable toy, such as float, ball, air bed, has an inflatable valve for air inflate and deflate. During shipping and storage, usually the inflatable is flat without air inside to save space. In usage, air will be pumped into the inflatable though a valve. After usage, the air will be squeezed out or pumped out to make the inflatable flat again.

Recently, many stuff materials such as confetti, glitter and feather are filled into the inflatables for fancy purposes. Then there is a problem, when the air needs to be deflated, the infill could also be abstracted outside. So it is necessary to keep the infill from escaping.

Currently, most inflatable are using PVC safety valve. Referring to FIG. 1, a safety valve 10 has a base 11 with an opening at the bottom, aligned with the air hole on the inflatable. Within the base, it receives a pipe 12 for air flow. The bottom of the pipe is closed but has a slot 13. In normal condition, the slot is closed to prevent air flow. When the pipe is squeezed, a slot at the bottom is opened to allow the air flow. At the top of pipe there is an opening 14, usually the nozzle of the pump can be plugged in for pumping. It also has a cap 15 to cap the opening. At the bottom of the base, there is a sleeve 16, extending from the peripheral of the edge. This sleeve 16 is used to attach the valve 10 onto the surface of the inflatable 20 to seal the air hole 21.

The production of inflatable is huge, and the inflatable valves are manufactured with standard mold and procedures. Therefore any intention to change the design of the air valve needs to consider the cost and effect.

BRIEF SUMMARY OF THE INVENTION

The primary objective of the present invention is to develop an inflatable valve filler to prevent infill from escaping.

Another objective of the present invention is to develop an inflatable valve filler which is easy to be applied with currently used valves.

Another objective of the present invention is to develop an inflatable valve filter with limited cost.

The invention comprises the following, in whole or part:
a filter body having a plurality of small holes for air flow; and
a patching sleeve extending from the peripheral of the filter body which is attached to the inflatable or the air valve to cover the opening of the air valve with the filter body.

For a more complete understanding of the present invention with its objectives and distinctive features and advantages, reference is now made to the following specification and to the accompanying drawings.

DETAILED DESCRIPTION OF THE INVENTION

Figure 1:
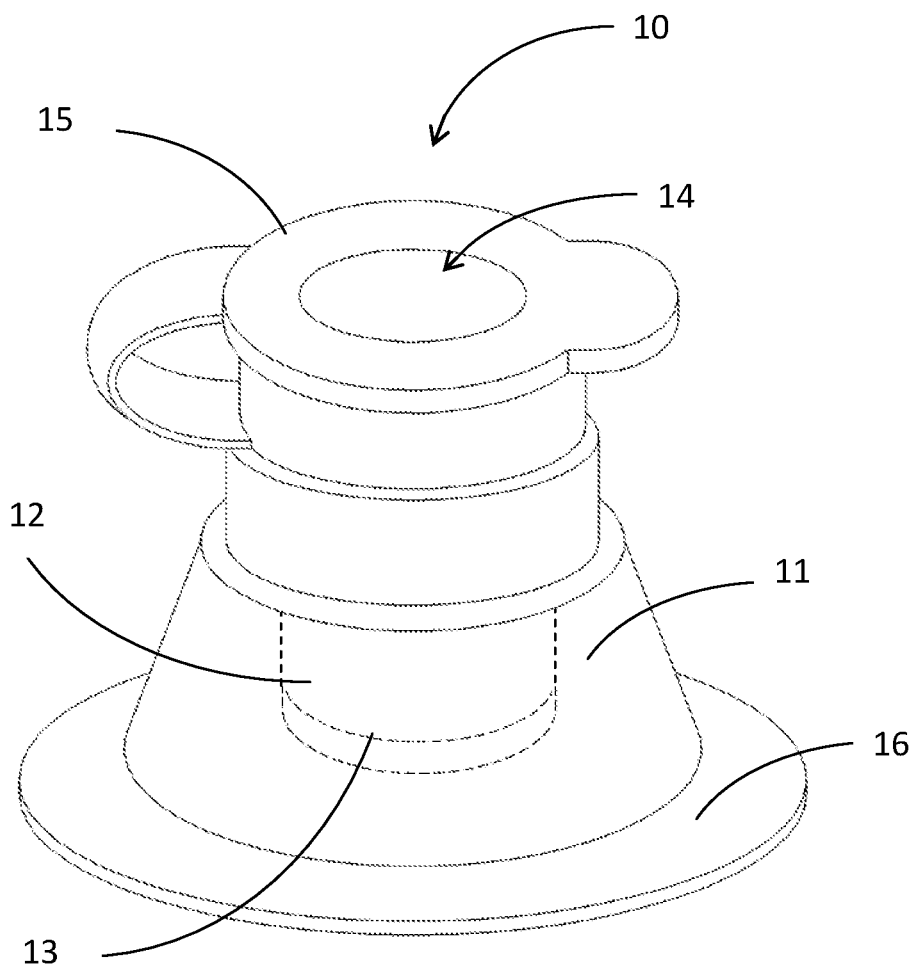
FIG. 1 is a perspective view of a safety valve of prior art.
Figure 2:
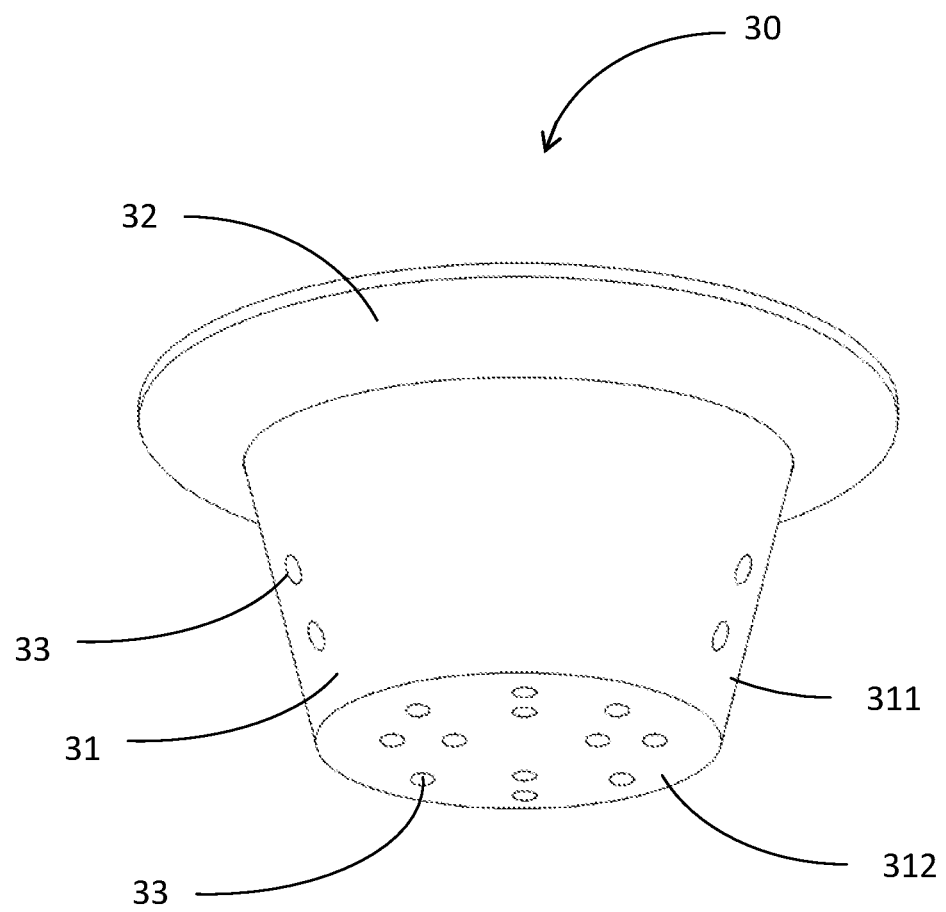
FIG. 2 is a perspective view of the inflatable valve filter according to the present embodiment of the invention.

In accordance with a preferred embodiment, FIG. 2 depict an inflatable valve filter 30 as a presently embodiment. The filter comprises a filter body 31 and a patching sleeve 32. The filter body 31 has a plurality of small holes 33. The size of the holes is large enough to let air flow, but small enough to stop the infill of the inflatable.

Figure 3:
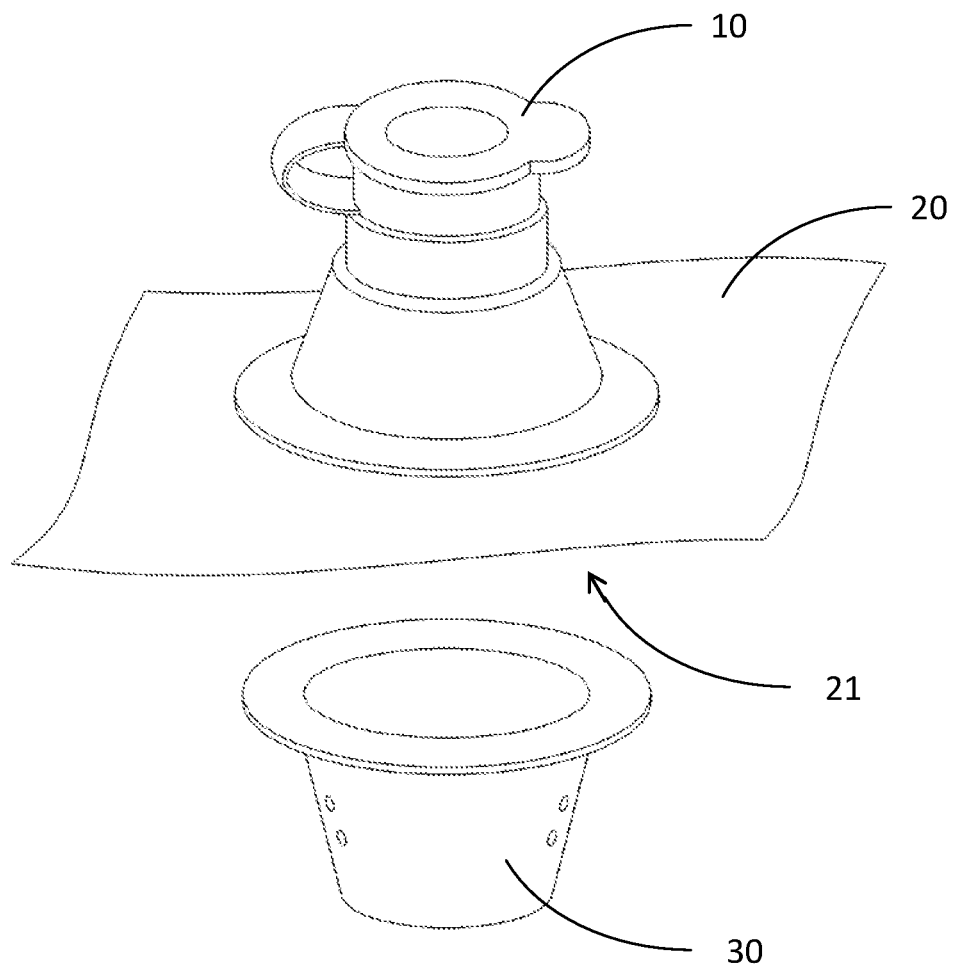
FIG. 3 is a schematic view of the inflatable valve filter assembled with the inflatable according to the present embodiment of the invention.

In the preferred embodiment, in order to make space for the air valve to operate, the filter body 31 protrudes from the surface level with a height. Referring to FIGS. 2 and 3, the filter body is in a cup shape with a wall 311; and a bottom piece 312 seals the edge of the wall 311. The bottom piece 312 has a distance with the air valve 10 so it won't block it.

Alternatively, besides the cup shape, the filter body 31 may have different shapes, such as semi sphere, barrel shape, etc. In an alternative embodiment of the present invention, the filter body 31 may be a flat membrane at the same level of the sleeve 32, if there is enough space for the air valve 10 to operate.

Figure 5:
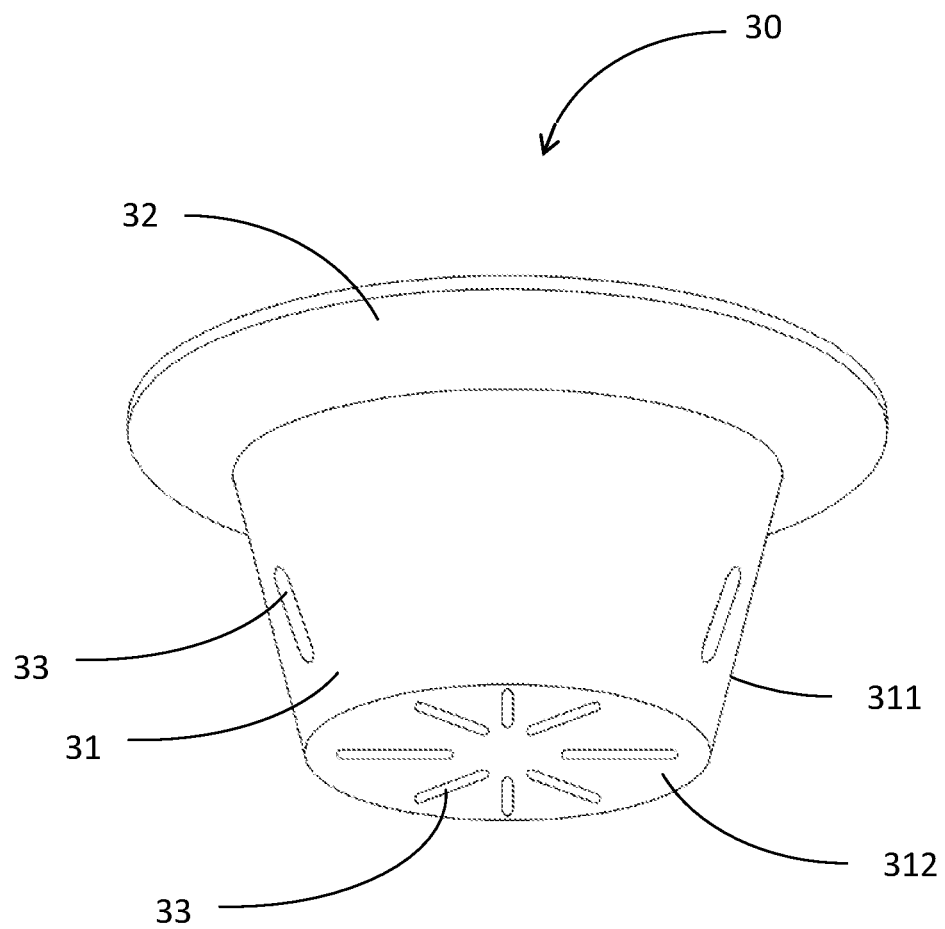
FIG. 5 is a perspective view of another alternative embodiment of the invention.

The shape of the small holes 33 may also be different. Preferably, the small holes 33 are round. Referring to FIG. 5, alternatively, some or all of the small holes 33 may be slots which are slim enough to stop the infill.

Referring to FIG. 2, the small holes are on both the wall 311 and the bottom piece 312 of the filter body 31 to increase the air flow. The number and the distribution of the holes may be alternative for manufacture and functional reasons.

The patching sleeve 32 extends from the top edge of the filter body 31 at the surface level of the inflatable 20. Preferably, the sleeve is in a round shape with a certain width.

With the patching sleeve, the valve filter 30 can be applied to an inflatable 20 directly. Referring to FIG. 3, the whole valve filter 30 can be inserted into the inflatable 20 through the air hole 21 thereon, and the patching sleeve 312 can be attached onto the inner surface of the inflatable 20 to seal the air hole 21. Or alternatively, the filter body 31 can be inserted into the inflatable 20 through the air hole 21 thereon, and the patching sleeve 312 can be attached on the outer surface of the inflatable 20 to seal the air hole 21.

Figure 4:
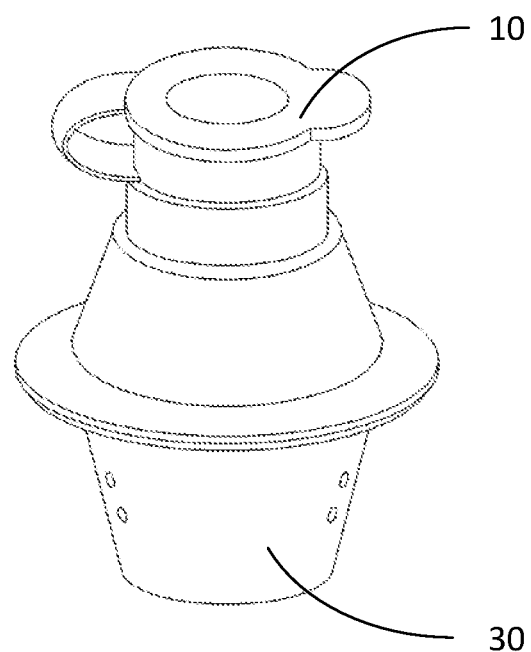
FIG. 4 is a schematic view of the inflatable valve filter assembled with the air valve according to the present embodiment of the invention.

Referring to FIG. 4, alternatively, the valve filter 30 can be attached to the sleeve 16 of the air valve 10 with the filter body 31 protruding against the air valve 10, and the air valve 10 with the valve filter 30 may be applied to the inflatable 20 later and let the filter body to cover the air hole of the inflatable eventually.

In order to adapt to the current using air valves, the valve filter 30 of the present invention is made of PVC. The patching sleeve 32 of the valve filter can be attached to the inflatable 20 or the air valve 10 by glue or heating. Alternatively, other materials may also be used to produce the valve filter 30.

In summary, the valve filter of the present invention can prevent infill from escaping from the inflatables. Also, it can be applied to inflatables and air valves without increase the cost or involving extra equipment.

While the embodiments and alternatives of the invention have been shown and described, it will be apparent to one skilled in the art that various other changes and modifications can be made without departing from the spirit and scope of the invention.

What is claimed is:

1. An inflatable toy having infill inside, comprising:
an inflatable body with an air hole;
an air valve over the air hole; and
a valve filter comprising a filter body having a plurality of holes to prevent infill pass through; and
a patching sleeve extending from the peripheral of the filter body, wherein the patching sleeve is attached to the inflatable body to cover the air hole.

2. The inflatable toy, as recited in claim 1, wherein the filter body protrudes away from the air valve.

3. The inflatable toy, as recited in claim 2, wherein the filter body comprises a wall protruding from the surface level of the inflatable inwardly; and a bottom piece sealing the bottom edge of the wall.

4. The inflatable toy, as recited in claim 3, wherein the filter body is in a cup shape.

5. The inflatable toy, as recited in claim 2, wherein the filter body is in a semi sphere shape.

6. The inflatable toy, as recited in claim 1, wherein the filter body is a flat membrane.

7. The inflatable toy, as recited in claim 3, wherein the holes on the filter body are round.

8. The inflatable toy, as recited in claim 3, wherein some of or all of the holes on the filter body are slots.

9. The inflatable toy, as recited in claim 6, wherein the holes on the filter body are round.

10. The inflatable toy, as recited in claim 6, wherein some of or all of the holes on the filter body are in slot shape.

11. A method for preventing infill from passing through the air valve of an inflatable toy, comprising step of:
making a valve filter by PVC, wherein the valve filter comprises a filter body having a plurality of holes to prevent infill pass through; and a patching sleeve extending from the peripheral of the filter body;
attaching the patching sleeve of the valve filter to the inflatable toy to cover the air hole of the inflatable toy.

12. The method, as recited in claim 11, wherein the patching sleeve of the valve filter is attached to the inner surface of the inflatable toy around the air hole with the filter body protruding inside the inflatable.

13. The method, as recited in claim 11, wherein the patching sleeve of the valve filter is attached to the outer surface of the inflatable toy around the air hole with the filter body protruding inside the inflatable.

14. The method, as recited in claim 11, wherein the patching sleeve of the valve filter is attached to the air valve to cover the bottom thereof, and then the air valve with the valve filter is assembled to the inflatable toy through the air hole with the filter body protruding inside the inflatable.

* * * * *